United States Patent
Bouzinov et al.

(10) Patent No.: US 10,061,878 B2
(45) Date of Patent: Aug. 28, 2018

(54) EFFECTIVELY SOLVING STRUCTURAL DYNAMICS PROBLEMS WITH MODAL DAMPING IN PHYSICAL COORDINATES

(71) Applicant: Dassault Systemes Simulia Corp., Johnston, RI (US)

(72) Inventors: Pavel A. Bouzinov, Johnston, RI (US); Mikhail Belyi, Johnston, RI (US)

(73) Assignee: Dassault Systemes Simulia Corp., Johnston, RI (US)

( * ) Notice: Subject to any disclaimer, the term of this patent is extended or adjusted under 35 U.S.C. 154(b) by 398 days.

(21) Appl. No.: 14/978,629

(22) Filed: Dec. 22, 2015

(65) Prior Publication Data

US 2017/0177769 A1 Jun. 22, 2017

(51) Int. Cl.
  *G06F 17/10* (2006.01)
  *G06F 17/50* (2006.01)
  *G06F 17/11* (2006.01)

(52) U.S. Cl.
  CPC .......... *G06F 17/5018* (2013.01); *G06F 17/11* (2013.01); *G06F 2217/16* (2013.01)

(58) Field of Classification Search
  CPC .................................................. G06F 17/5018
  USPC ............................................................ 703/2
  See application file for complete search history.

(56) References Cited

U.S. PATENT DOCUMENTS

| | | | |
|---|---|---|---|
| 5,920,491 A | 7/1999 | Hibbitt et al. | |
| 6,090,147 A | 7/2000 | Bremner et al. | |
| 6,353,801 B1 | 3/2002 | Sercu et al. | |
| 7,188,039 B2 | 3/2007 | Bennighof | |
| 7,392,502 B2 | 6/2008 | Percin et al. | |
| 7,822,289 B2 * | 10/2010 | Szeliski | G06F 17/13 382/274 |
| 8,000,942 B2 | 8/2011 | El-Wardany et al. | |
| 9,063,882 B1 * | 6/2015 | Zhao | G06F 17/12 |
| 9,361,413 B1 | 6/2016 | Bout et al. | |
| 2003/0076990 A1 | 4/2003 | Brand | |

(Continued)

OTHER PUBLICATIONS

Barbic, FEM Simulation of 3D Deformable Solids: A practitioner's guide to theory, discretization and model reduction. Part 2: Model Reduction, Aug. 4, 2012, pp. 1-15.

(Continued)

*Primary Examiner* — Andy Ho

(74) *Attorney, Agent, or Firm* — Hamilton, Brook, Smith & Reynolds, P.C.

(57) ABSTRACT

Embodiments provide methods and systems for modeling mechanical features of a structural dynamic system. A method according to an embodiment provides, in computer memory, a finite element model representing a structural dynamic system. Next, in a processor coupled to the computer memory, a system of equations with a first term representing a linear combination of a mass, a stiffness, and a damping of the finite element model and a second term representing modal damping is solved. According to such an embodiment, the system of equations is solved using the Sherman-Morrison-Woodbury formula or a preconditioned iterative method. In turn, an improved 3D model of a real world object based on the finite element model is formed utilizing results of the solved system of equations with the finite element model and modal damping to model mechanical features of the represented structural dynamic system.

20 Claims, 7 Drawing Sheets

(56) References Cited

U.S. PATENT DOCUMENTS

| | | |
|---|---|---|
| 2007/0286468 A1 | 12/2007 | Joshi et al. |
| 2010/0082724 A1* | 4/2010 | Diyankov ............... G06F 17/16 708/520 |
| 2010/0211370 A1 | 8/2010 | Maliassov |
| 2013/0085730 A1 | 4/2013 | Shaw et al. |
| 2013/0090902 A1 | 4/2013 | Yao et al. |
| 2013/0218538 A1* | 8/2013 | Fuecker .............. G06F 17/5018 703/2 |

OTHER PUBLICATIONS

Hutter et al., "Visualisation of User Defined Finite Elements with Abaqus/Viewer," Institute of Mechanics and Fluid Dynamics, TU Bergakademie Freiberg, 2012, pp. 7-14.

Bindel; "Matrix Computations—Sherman-Morrison-Woodbury;" (Fall 2009) pp. 1-5; XP055369034.

Extended European Search Report for Application No. 16206366.3; Dassault Systemes Simulia Corp.; dated May 16, 2017; 14 pages.

Kim et al.; "Fast frequency response analysis of partially damped structures with non-proportional viscous damping;" Journal of Sound and Vibration 297 (2006) pp. 1075-1081.

Kim; "A preconditioned iterative method for modal frequency-response analysis of structures with non-proportional damping;" Journal of Sound and Vibration 297 (2006) pp. 1097-1103.

Kim; "Damped dynamic response determination in the frequency domain for partially damped large scale structures;" Journal of Sound and Vibration 326 (2009) pp. 703-708.

Lanczos, C., "The Variational Principles of Mechanics", $4^{th}$ Edition, Dover Publications, 1986.

Zienkiewicz, O.C., et al., "The Finite Element Method: Its Basis and Fundamentals", $6^{th}$ Edition, Elsevier Butterworth-Heinemann, 2005.

Craig, R.R., Jr., et al., "Fundamentals of Structural Dynamics", Second Edition, John Wiley & Sons, Inc., Chapters 11 and 14 (2006).

Dhandole, S D. et al.: "A comparative study of methodologies for vibro-acoustic FE model updating of cavities using simulated data", International Journal of Mechanics and Materials in Design, Kluwer Academic Publishers, DO, vol. 6, No. 1, Mar. 11, 2010, pp. 27-43.

Extended EP Search Report for EP 15 176 734 dated Nov. 13, 2015 entitled "System and Method of Recovering Lagrange Multipliers in Modal Dynamic Analysis".

Friswell, "Model updating in structural dynamics", Journal of Sound and Vibration, Jan. 1, 1993, pp. 347-375.

Jezequel, L. et al.: "A procedure for improving component-mode representation in structural dynamic analysis", Journal of Sound & Vibration, London, GB. vol. 144, No. 3, Feb. 8, 1991, pp. 409-419.

Komzsik, L., "What Every Engineer Should Know About Computational Techniques of Finite Element Analysis", Second Edition, CRC Press, Chapters 13 and 15 (2009).

Simeon, B., "On Lagrange multipliers in flexible multibody dynamics", Comput. Methods Appl. Mech. and Engrg., 195:6993-7005 (2006).

Yang, Shih-Ming, "Modal Analysis of Structures with Holonomic Constraints", AIAA Journal, vol. 30(10):2526-2531 (Oct. 1992).

Abaqus Theory Manual, "Implicit Dynamic Analysis," pp. 2.4.1-1-2.4.1-7 (2014).

Bathe, Klaus-Jurgen, "Finite Element Procedures", Prentice Hall, pp. 749-761 (1982).

Bianchi, et al., "Using modal damping for full model transient analysis, Application to pantograph/catenary vibration", Proceedings of ISMA2010 Including USD2010, pp. 1167-1180, (2010).

Clough, R.W., and Penzien, Joseph, Dynamics of Structures, Computers & Structures, Inc., $3^{rd}$ Edition, pp. 234-242 (2003).

Craig, R.R. and Kurdila, A.J., "Fundamentals of Structural Dynamics", John Wiley & Sons, Inc., $2^{nd}$ Edition, pp. 326-327 (2006).

Demmel, J.W., "Applied Numerical Linear Algebra", Society for Industrial and Applied Mathematics, 14 pgs. (1997).

Girard, A., and Roy, N., Structural Dynamics in Industry, John Wiley and Sons, Inc., pp. 96, 97, and 115-121 (2008).

Hager, W.W., "Updating the Inverse of a Matrix", Society for Industrial and Applied Mathematics, vol. 31 No. 2, pp. 221-239 (1989).

Higham, N.J., "Accuracy and Stability of Numerical Algorithms", Society for Industrial and Applied Mathematics, $2^{nd}$ Edition, p. 258 (2002).

Hilber et al., "Collocation, Dissipation and 'Overshoot' for Time Integration Schemes in Structural Dynamics", Earthquake Engineering and Structural Dynamics, vol. 6, pp. 99-117 (1978).

Hilber, H.M., et al., "Improved Numerical Dissipation for Time Integration Algorithms in Structural Dynamics", Earthquake Engineering and Structural Dynamics, vol. 5, pp. 283-292 (1977).

Wilson, E.L. and Penzien, J. "Evaluation of Orthogonal Damping Matrices", International Journal for Numerical Methods in Engineering, vol. 4, pp. 5-10 (1972).

Korotkov, V., et al., "Account of Modal Damping Instead Rayleigh One in Floor Response Spectra Analysis in Civil Structures of Nuclear Power Plants (NPP) Under Aircraft Crash", 2014 Simulia Community Conference, pp. 1-12 (2014).

Newmark, N.M., "A Method of Computation for Structural Dynamics," Journal of the Engineering Mechanics Division, Proceedings of the American Society of Civil Engineers, pp. 67-94 (1959).

van der Vorst, H.A., "Iterative Krylov Methods for Large Linear Systems", Cambridge Monographs on Applied and Computation Mathematics, 18 pgs. (2003).

Saad, Yousef, "Iterative Methods for Sparse Linear Systems", Society for Industrial and Applied Mathematics, 567 pgs. (2003).

Bakhvalov, N.S., "Numerical Methods: Analysis, Algebra, Ordinary Differential Equations," MIR, 18 pgs. (1997).

* cited by examiner

EFFECTIVELY SOLVING STRUCTURAL DYNAMICS PROBLEMS WITH MODAL DAMPING IN PHYSICAL COORDINATES

BACKGROUND

Embodiments of the invention generally relate to the field of computer programs and systems, and specifically to the field of computer aided design (CAD), computer-aided engineering (CAE), modeling, and simulation.

A number of systems and programs are offered on the market for the design of parts or assemblies of parts. These so called CAD systems allow a user to construct and manipulate complex three-dimensional models of objects or assemblies of objects. CAD systems thus provide a representation of modeled objects, such as real-world objects, using edges or lines, in certain cases with faces. Lines, edges, faces, or polygons may be represented in various manners, e.g., non-uniform rational basis-splines (NURBS).

These CAD systems manage parts or assemblies of parts of modeled objects, which are mainly specifications of geometry. In particular, CAD files contain specifications, from which geometry is generated. From geometry, a representation is generated. Specifications, geometry, and representations may be stored in a single CAD file or multiple CAD files. CAD systems include graphic tools for representing the modeled objects to the designers; these tools are dedicated to the display of complex objects. For example, an assembly may contain thousands of parts.

The advent of CAD and CAE systems allows for a wide range of representation possibilities for objects. One such representation is a finite element analysis model. The terms finite element analysis model, finite element model, finite element mesh, and mesh are used interchangeably herein. A finite element model typically represents a CAD model, and thus, may represent one or more parts or an entire assembly of parts. A finite element model is a system of points called nodes which are interconnected to make a grid, referred to as a mesh. The finite element model may be programmed in such a way that the FEM has the properties of the underlying object or objects that it represents. When a finite element model is programmed in such a way, it may be used to perform simulations of the object that it represents. For example, a finite element model may be used to represent the interior cavity of a vehicle, the acoustic fluid surrounding a structure, and any number of real-world objects, including, for example, medical devices such as stents. When a given finite element model represents an object and is programmed accordingly it may be used to simulate the real-world object itself. For example, a finite element model represent a stent may be used to simulate the use of the stent in a real-life medical setting.

These simulations can be used to improve on the design of the real-world object that is being simulated. For example, a finite element model of a dynamic system can be used in a simulation to identify a point of failure of the system. In turn, a three-dimensional CAD model that is represented by the finite element model and ultimately represents the real-world object itself, can be improved using the feedback from the simulation. While methodologies exist for performing simulations of finite element models and for improving underlying CAD models, these existing methodologies can benefit from functionality to improve efficiency.

SUMMARY OF THE INVENTION

Embodiments of the present invention improve on techniques for CAE and provide methods and apparatuses for dynamic simulation of engineering systems. For example, embodiments can be leveraged to model automotive noise and vibration or durability simulations, airspace dynamics, and seismic analysis of safety-related nuclear structures and nuclear power plant buildings.

An embodiment of the present invention provides a computer implemented method of modeling mechanical features of a structural dynamic system. Such an embodiment begins by providing, in computer memory, a finite element model that represents a structural dynamic system. Then, in a processor coupled to the computer memory storing the model, a system of equations is solved, where the system of equations has a first term that represents a linear combination of a mass, a stiffness, and a damping of the finite element model and a second term representing modal damping. In such an embodiment, the system of equations is solved using the Sherman-Morrison-Woodbury formula or a preconditioned iterative method. In turn, an improved 3D model of a real world object based on the finite element model is formed utilizing results of the solved system of equations with the finite element model and modal damping to model mechanical features of the represented structural dynamic system.

According to an embodiment of the invention, the system of equations is solved using the Sherman-Morrison-Woodbury formulation by expanding a matrix of the system of equations by including an auxiliary vector of unknowns to a set of unknowns of the system of equations, and in turn, solving the system of equations with the expanded matrix. According to an embodiment, the auxiliary vector of unknowns has a size that is equivalent to a number of eigenmodes used in the second term representing the modal damping.

Embodiments of the invention may utilize any variety of iterative methods known in the art. For example, in an embodiment, the iterative method includes at least one of: a Richardson iterative scheme, a preconditioned minimal residual method, a conjugate gradient method, and a generalized minimal residual method. In one such embodiment of the present invention, the preconditioned iterative method utilizes the first term, representing the linear combination of a mass, a stiffness, and a damping of the finite element model without modal damping as the preconditioner.

According to an embodiment, providing the finite element model and solving the system of equations may be performed in an existing linear equation solver, thus, further increasing efficiency in implementing embodiments of the present invention.

Embodiments of the present invention may be used to simulate any variety of structural dynamic systems. Example systems include an automotive noise and vibration system, an automotive durability system, an airspace dynamics system, and a seismic system. Further, embodiments may model any mechanical features of these systems, such as velocity, acceleration, strain, stress, frequency, density, vibration, displacement, and force.

Another embodiment of the present invention is directed to a computer system for modeling mechanical features of a structural dynamic system. According to such an embodiment, the system comprises a processor and memory with computer code instructions stored thereon. The processor, and the memory with the computer code instructions, are configured to cause the system to provide a finite element model representing a structural dynamic system and solve a system of equations with a first term representing a linear combination of a mass, a stiffness, and a damping of the provided finite element model and a second term representing modal damping. In such an embodiment, the system of equations is solved using a Sherman-Morrison-Woodbury formula or a preconditioned iterative method. Further, such a computer system, according to an embodiment, is configured to form an improved 3D model of a real world object based on the finite element model by utilizing results of the solved system of equations with the finite element model and modal damping to model mechanical features of the represented structural dynamic system.

In yet another embodiment of the computer system, solving the system of equations using the Sherman-Morrison-Woodbury formula comprises expanding a matrix of the system of equations by including an auxiliary vector of unknowns to the set of unknowns of the system of equations and, in turn, solving the system of equations with the expanded matrix. In such an embodiment, the auxiliary vector has a size equivalent to a number of eigenmodes used in the second term representing the modal damping According to an embodiment of the system, the preconditioned iterative method includes at least one of: a Richardson iterative scheme, a preconditioned minimal residual method, a conjugate gradient method, and a generalized minimal residual method. In an alternative method, the preconditioned iterative method utilizes the first term, representing the linear combination of a mass, a stiffness, and a damping of the finite element model without modal damping, as a preconditioner. In yet another embodiment, the system implements the providing and solving in an existing linear equation solver.

Yet another embodiment of the present invention is directed to a cloud computing implementation for modeling mechanical features of a structural dynamic system. Such an embodiment is directed to a computer program product executed by a server in communication across a network with one or more clients. In such an embodiment, the computer program product comprises a computer readable medium which comprises program instructions, which, when executed by a processor causes: providing a finite element model representing a structural dynamic system and solving a system of equations with a first term representing a linear combination of a mass, a stiffness, and a damping of the finite element model and a second term representing modal damping. In such an embodiment, the system of equations is solved using the Sherman-Morrison-Woodbury formula or a preconditioned iterative method. Further, according to an embodiment, the program instructions, when executed by the processor, further causes forming an improved 3D model of a real world object based on the finite element model by utilizing results of the solved system of equations with the finite element modal and modal damping to model mechanical features of the represented structural dynamic system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
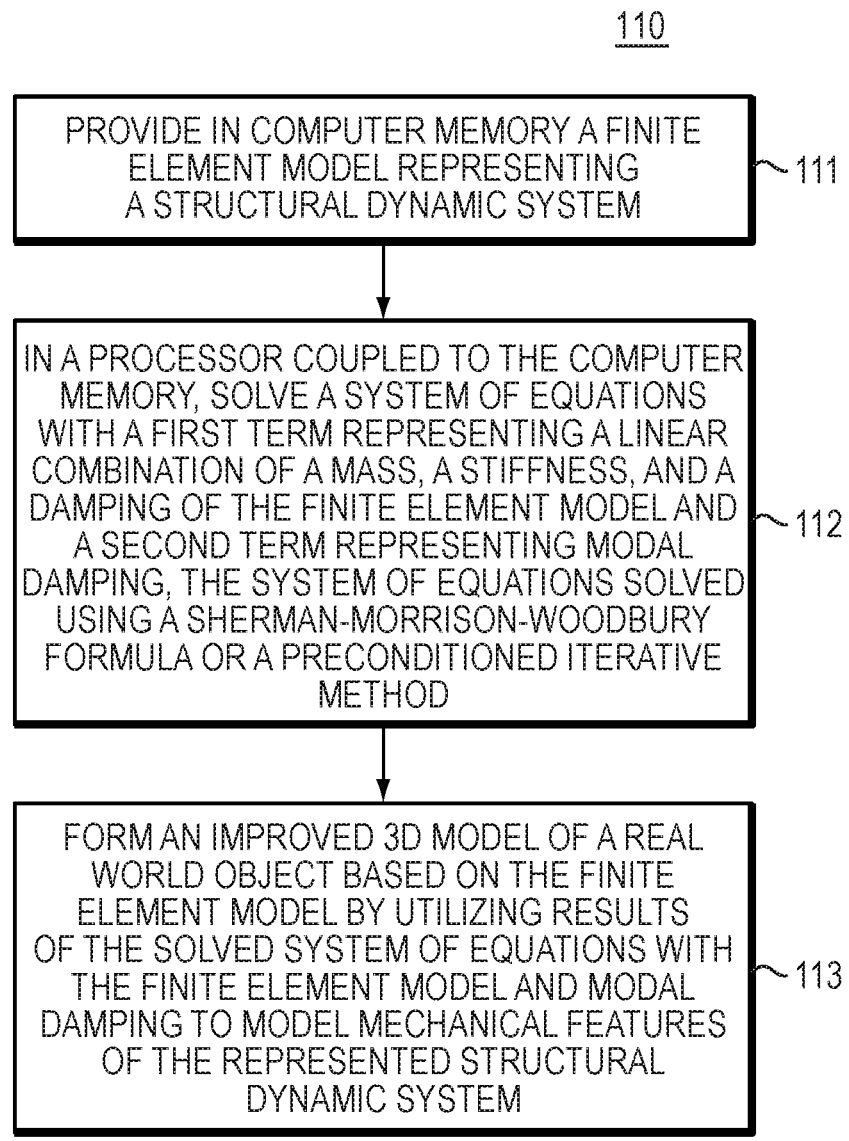
FIG. 1 is a flowchart of a computer implemented method of modeling mechanical features of a structural dynamic system according to at least one example embodiment.

A description of example embodiments of the invention follows.

The teachings of all patents, published applications, and references cited herein are incorporated by reference in their entirety.

Embodiments of the present invention provide methods and systems for modeling mechanical features of structural dynamic systems. As noted in *Abaqus Theory Guide*, Release 6.14 by Dassault Systemes, the equations of motion of a nonlinear structural dynamics problem solved with the finite element method takes the general form of equation (1) below:

$$J(u,\dot{u})+P(u,\dot{u})=f(t) \tag{1}$$

where the first term on the left hand side $J(u,\dot{u})$ represents the inertia force vector, the second term on the left had side $P(u,\dot{u})$ represents the internal force vector, $f(t)$ is the vector of externally applied forces, and u is the unknown vector of displacements. Herein, the "over-dot" notation is used to represent the time derivative. For a linear structural dynamics problem, equation (1) takes the form:

$$M\ddot{u}+C\dot{u}+Ku=f(t) \tag{2}$$

with M, K, and C as the mass, stiffness, and viscous damping matrices, respectively.

Solving a transient dynamic problem requires integration of equation (1) or equation (2) with applied initial conditions specifying displacements and velocities at time t=0. This is shown below by the relationships (3).

$$u|_{t=0}=u_0, \dot{u}|_{t=0}=v_0 \tag{3}$$

Steady state dynamic analysis is extensively used in structural dynamic simulations of engineering systems to compute the response of the system to steady-state time-harmonic excitation. The steady state dynamic problem for damped elastic structures reduces to the following system of complex linear algebraic equations that are solved at each frequency from the given set of excitation frequencies.

$$(-\omega^2 M+i\omega C+K+iS)U=F, \omega \in \{\omega_1,\omega_2,\ldots,\omega_N\} \tag{4}$$

In equation (4) $\omega$ is the angular frequency of the time-harmonic excitation, $i=\sqrt{-1}$, F is the complex load, and $U=U(\omega)$ is the complex frequency response. On the left hand side of equation (4), M, K, and C are the mass, stiffness, and viscous damping matrices, respectively, and S is the structural damping matrix that is used in the frequency domain dynamic analysis. In many engineering simulations, matrices on the left and right hand sides of equation (4) can depend on the excitation frequency $\omega$.

There are various techniques used to perform simulations of engineering systems. Such as non-direct methods and direct methods for performing dynamic response calculations of engineering systems. As used herein, "direct" refers to structural dynamic solution methods that calculate the dynamic response directly in physical coordinates. For example, solving a system of complex linear equations, such as equation (4), for the frequency response using a variation of the Gaussian elimination method or using an iterative method is a direct solution method according this classification. Likewise, step-by-step numerical integration of equations of motion, such as, equations (1) and (2), is also considered a direct structural dynamics solution method.

A non-direct methodology is mode superposition. Mode superposition or normal mode method is an approximate technique based on the dynamic response representation in the form of a linear combination of the natural modes of the undamped system. Such a methodology is further described in Craig et al., *Fundamentals of Structural Dynamics*, 2d ed., John Wiley & Sons, Inc., (2006) and Girard et al., *Structural Dynamics in Industry*, John Wiley & Sons, Inc., (2008). Mode superposition methods are extensively used to obtain the dynamic response of large linear systems by transforming the equations of motion of the systems to principal coordinates and solving the resulting set of reduced equations of motion. However, some structural dynamics problems cannot be effectively handled in this manner, such as systems with nonlinearities or frequency-domain problems with frequency-dependent mechanical properties. Such systems require solving the equations of motion with respect to the finite element nodal degrees of freedom or physical coordinates by direct methods.

There are also a variety of direct time integration methods for calculating the dynamic response of an engineering system. Direct numerical integration algorithms for solving transient dynamic problems can be broadly characterized as implicit or explicit. Explicit schemes obtain values for dynamic quantities at time t+Δt based entirely on available values at time t. In such a methodology Δt is a time increment. Explicit schemes are only conditionally stable; the stability limit being approximately equal to the time for an elastic wave to cross the smallest element dimension in the model that is being simulated. Implicit schemes remove this upper bound on time step size by solving for dynamic quantities at time t+Δt based not only on values at t, but also on these same quantities at t+Δt. Further, because they are implicit, nonlinear equations must be solved at every time increment of a nonlinear dynamic analysis. As noted in Hilber et al., "Collocation, Dissipation and 'Overshoot' for Time Integration Schemes in Structural Dynamics," *Earthquake Engineering and Structural Dynamics*, vol. 6, pp. 99-117, structural problems solved using implicit integration schemes usually give acceptable solutions with time steps typically one or two orders of magnitude larger than the stability limit of explicit schemes, but the response prediction will deteriorate as the time step size, Δt, increases relative to the period, T, of typical modes of response. Three factors are typically considered when selecting the allowable time step size: the rate of variation of the applied loading, the complexity of the nonlinear damping and stiffness properties, and the typical period of vibration of the structure. In general, a maximum increment versus period ratio of $$\frac{\Delta t}{T} < \frac{1}{10}$$

is a good rule for obtaining reliable results. Below are examples of explicit and implicit time integration schemes however, it is noted that the various methodologies discussed below are applicable to other explicit or implicit dynamic integration algorithms as well.

An example of an explicit dynamic integration procedure is used in Abaqus®, as described in *Abaqus Theory Guide*, Release 6.14 by Dassault Systemes. The explicit dynamic integration procedure used in Abaqus® is based upon the implementation of an explicit integration rule together with use of diagonal or "lumped" finite element mass matrices. The equations of motion, given by equation (1) are integrated using the explicit central difference integration rule yielding the equations (5) below:

$$\dot{u}_{n+0.5} = \dot{u}_{n-0.5} + \frac{1}{2}(\Delta t_{n+1} + \Delta t_n)\ddot{u}_n, \tag{5}$$

$$u_{n+1} = u_n + \Delta t_{n+1}\dot{u}_{n+0.5}$$

where u, u̇, and ü are displacement, velocity, and acceleration vectors respectively. Here and below the subscript n refers to the n-th step time value:

$$t_0 = 0, \; t_n = \sum_{i=1}^{n} \Delta t_i.$$

The subscripts n−0.5 and n+0.5 refer to mid-step values. The central difference integration operator is explicit in the sense that the kinematic state can be advanced using known values of, $\dot{u}_{n-0.5}$ and $\ddot{u}_n$ from the previous step.

Explicit integration rule (5) is quite simple, but by itself it does not provide the computational efficiency associated with the explicit dynamics procedure. The key to the computational efficiency of the explicit procedure is the use of the inertia force vector in the form of equation (6)

$$J(u,\ddot{u}) = M(u)\ddot{u} \tag{6}$$

with the diagonal or lumped mass matrix because the inversion of the mass matrix is used in the computation for the accelerations at the beginning of the increment given by:

$$\ddot{u}_n = M^{-1}(u_n)[f(t_n) - P(u_n,\dot{u}_n)] \tag{7}$$

Another direct methodology is the implicit dynamic integration algorithm. One such implicit dynamic integration algorithm is the α-method proposed by Hilber, Hughes, and Taylor in Hilber et al., "Improved Numerical Dissipation for Time Integration Schemes in Structural Dynamics," *Earthquake Engineering and Structural Dynamics*, vol. 5, pp, 283-292, (1977) and Hilber et al., "Collocation, Dissipation, and 'Overshoot' For Time Integration Schemes in Structural Dynamics," *Earthquake Engineering and Structural Dynamics*, vol. 6, pp. 99-117 (1978). The α-method relies on the following interpolations (shown by equations (8)), that are common for the Newmark-type family of the structural dynamics solution algorithms as described by Newmark, "A Method of Computation for Structural Dynamics," *Journal of the Engineering Mechanics Division*, ASCE, pp. 67-94, (1959).

$$\dot{u}_{n+1} = \dot{u}_n + \Delta t_{n+1}[(1-\gamma)\ddot{u}_n + \gamma\ddot{u}_{n+1}], \tag{8}$$

$$u_{n+1} = u_n + \Delta t_{n+1}\dot{u}_n + \frac{\Delta t_{n+1}^2}{2}[(1-2\beta)\ddot{u}_n + 2\beta\ddot{u}_{n+1}]$$

In the equations (8), $u_n$, $\dot{u}_n$, and $\ddot{u}_n$ are displacement, velocity, and acceleration vectors at time $t_n$; and γ and β are the parameters.

The equations (8) can be solved with $u_{n+1}$ as primary unknowns, as depicted in the equations (9):

$$\ddot{u}_{n+1} = \frac{1}{\beta \Delta t_{n+1}^2}(u_{n+1} - u_n) - \frac{1}{\beta \Delta t_{n+1}}\dot{u}_n - \left(1 - \frac{1}{2\beta}\right)\ddot{u}_n, \quad (9)$$

$$\dot{u}_{n+1} = \frac{\gamma}{\beta \Delta t_{n+1}}(u_{n+1} - u_n) - \left(\frac{\gamma}{\beta} - 1\right)\dot{u}_n - \left(\frac{\gamma}{2\beta} - 1\right)\Delta t_{n+1} \ddot{u}_n$$

The α-method operation replaces equation (1) with a balance of inertia forces at the end of the time step and a weighted average of the internal and external forces at the beginning and end of the time step, which yields equation 10:

$$J(u_{n+1}, \ddot{u}_{n+1}) + (1+\alpha)P(u_{n+1}, \dot{u}_{n+1}) - \alpha P(u_n, \dot{u}_n) = (1+\alpha)f(t_{n+1}) - \alpha f(t_n) \quad (10)$$

The resulting system of nonlinear algebraic equations (10) can be solved by either the Newton-Raphson iterative method which has a quadratic convergence in the neighborhood of the solutions, secant methods, or quasi-Newton methods, which is described in Bathe, *Finite Element Procedures in Engineering Analysis*, Prentice-Hal, (1982). The foregoing methodologies all solve linearized equations per iteration with several iterations per time step. For example, consider the Newton-Raphson iterative method where the residual of equation (10) can be defined as:

$$R(u_{n+1}) = J(u_{n+1}, \ddot{u}_{n+1}) + (1+\alpha)P(u_{n+1}, \dot{u}_{n+1}) - \alpha P(u_n, \dot{u}_n) - (1+\alpha)f(t_{n+1}) + \alpha f(t_n) \quad (11)$$

At the k-th iteration of the Newton method for the (n+1)-th time step of equation (11), the following system of linear equations is solved:

$$B_{n+1}^{(k)} \Delta u_{n+1}^{(k)} = b_{n+1}^{(k)}, u_{n+1}^{(k)} = u_{n+1}^{(k-1)} + \Delta u_{n+1}^{(k)} \quad (12)$$

where $$B_{n+1}^{(k)} = \frac{\partial R}{\partial u_{n+1}}\left(u_{n+1}^{(k-1)}\right), b_{n+1}^{(k)} = -R\left(u_{n+1}^{(k-1)}\right) \quad (13)$$

Using such a methodology, the matrix $$\frac{\partial R}{\partial u_{n+1}}$$

is obtained by differentiating the residual (11) and using equations (9) yields the equation (14) below:

$$\frac{\partial R}{\partial u_{n+1}} = \frac{\partial J}{\partial u_{n+1}} + \frac{1}{\beta \Delta t_{n+1}^2}\frac{\partial J}{\partial \ddot{u}_{n+1}} + \frac{(1+\alpha)\gamma}{\beta \Delta t_{n+1}}\frac{\partial P}{\partial \dot{u}_{n+1}} + (1+\alpha)\frac{\partial P}{\partial u_{n+1}} \quad (14)$$

The α-method can be applied to the linear structural dynamics problem (2) which gives the system of equations:

$$\left[\frac{1}{\beta \Delta t_{n+1}^2}M + \frac{(1+\alpha)\gamma}{\beta \Delta t_{n+1}}C + (1+\alpha)K\right]u_{n+1} = \quad (15)$$

$$(1+\alpha)f(t_{n+1}) - \alpha f(t_n) + M\left[\frac{1}{\beta \Delta t_{n+1}^2}u_n + \frac{1}{\beta \Delta t_{n+1}}\dot{u}_n + \left(1 - \frac{1}{2\beta}\right)\ddot{u}_n\right] +$$

$$C\left[\frac{(1+\alpha)\gamma}{\beta \Delta t_{n+1}}u_n + \left(\frac{\gamma}{\beta} - 1 + \frac{\alpha\gamma}{\beta} - 2\alpha\right)\dot{u}_n + (1+\alpha)\left(\frac{\gamma}{2\beta} - 1\right)\Delta t_{n+1}\ddot{u}_n\right]$$

-continued $$\ddot{u}_n + \alpha K u_n$$

The system of equations (15) can, in turn, be solved at each time step. If the time increment does not change from step to step, $\Delta t_{n+1} = \Delta t = \text{const}$, and then, the matrix that multiplies $u_{n+1}$ on the left hand side of equation (15) does not change with time steps. Once this constraint matrix is factorized, the solution for the displacements at each time step only requires the right hand side calculation plus a forward reduction and a back substitution.

Damping is an important issue in structural dynamics; however, damping can further complicate simulating said structural dynamic systems. Various different models of damping are available, such as velocity-dependent viscous damping, displacement-dependent structural damping, contact damping taking account the sliding friction on the contact surfaces, linear and nonlinear connections with damping, visco-elastic and elastic-plastic materials, and many others. A variety of damping models are described in Craig, R. R., Kurdila, A. J. *Fundamentals of Structural Dynamics*—2nd ed., John Wiley & Sons, Inc., (2006), Girard, A. Roy, Nicolas. *Structural Dynamics in Industry*, John Wiley & Sons, Inc., (2008), and Wilson E. L, Pensien J., "Evaluation of orthogonal damping matrices", *International Journal for Numerical Methods in Engineering*, vol. 4, pp. 5-10, (1972).

Viscous damping is velocity dependent. Direct structural dynamic solution methods support general viscous damping that can include: linear or nonlinear dashpots and connector elements, surface interaction damping, material damping, time domain or frequency domain viscoelasticity, and proportional Rayleigh damping. Different sources of viscous damping contribute to the internal force vector, and the different sources of damping form the global viscous damping matrix of the linearized model that is based on the structural dynamic system being simulated. The global viscous damping matrix is usually sparse as are other global operators of the finite element method.

So-called "hysteretic damping" or "structural damping" is a useful but complex damping model. Energy dissipation is modeled by means of the complex stiffness, which leads to displacement dependent damping. Complex stiffness cannot be derived using physical laws. It is only applicable in the frequency domain. The structural damping operator can include contributions from material damping, complex springs, and connectors. Further, the structural damping operator can be set to be proportional to the real stiffness, or it can be defined as a matrix and imported into the model. Direct frequency response analysis supports general global sparse structural damping operators in the frequency domain. Using general viscous and structural damping in engineering simulations requires tuning the damping models to measurements and experimental data which can be a challenging task.

Yet another damping model is modal damping. Modal damping is defined in conjunction with the modal superposition method. In modal damping, the rectangular matrix $\Phi_{1 \ldots m}$ and diagonal matrix $\Phi_{1 \ldots m} = \text{diag}(\omega_1, \ldots, \omega_m)$ are the partial solution of the generalized eigenvalue problem, which is given by equation (16)

$$K\Phi_{1 \ldots m} = M\Phi_{1 \ldots m}\Omega_{1 \ldots m}^2, \quad \Phi_{1 \ldots m}^T M \Phi_{1 \ldots m} = I \quad (16)$$

where M and K are the mass and stiffness matrices, respectively, and I is the m×m identity matrix. The columns of the matrix $\Phi_m$, are mass-normalized eigenvectors (mode shapes), m denotes the number of eigenmodes, and $\omega_i$, i=1, ..., m are the natural frequencies of the linear system. The modal viscous and structural damping matrices are defined in Craig, R. R., Kurdila, A. J. *Fundamentals of Structural Dynamics*—2nd ed., John Wiley & Sons, Inc., (2006), Wilson E. L, Pensien J., "Evaluation of orthogonal damping matrices", *International Journal for Numerical Methods in Engineering*, vol. 4, pp. 5-10, (1972), and Clough R. W., Penzien J., *Dynamics of structures*, 3rd ed., Computers & Structures, (2003) as $$C_{modal} = \Psi D \Psi^T, S_{modal} = \Psi H \Psi^T \quad (17)$$

where $$\Psi = M \Phi_{1 \ldots m} \quad (18)$$

In implementing such a methodology, the matrices D and H are positive definite in order to facilitate representing energy dissipation in the system. Further, in such a methodology, the relationships (19) are true where:

$$\Phi_{1 \ldots m}^T C_{modal} \Phi_{1 \ldots m} = D, \Phi_{1 \ldots m}^T S_{modal} \Phi_{1 \ldots m} = H \quad (19)$$

Usually, the m×m matrices D and H are chosen to be diagonal where $$D = \mathrm{diag}(d_1, \ldots, d_m), H = \mathrm{diag}(h_1, \ldots, h_m) \quad (20)$$

However, there are no fundamental restrictions for these relatively "small" matrices to be dense. Diagonal modal damping leads to as many damping coefficients as there are modes, which can facilitate easy tuning of these coefficients to measurements. Typically, diagonal viscous and structural damping entries are express through the damping factors and the eigenfrequencies co given by $$d = 2\xi_i \omega_i, h_i = \eta_i \omega_i^2, i=1, \ldots, m \quad (21)$$

where $\xi_i$ is the viscous modal damping factor for the i-th eigenmode: $\xi_i = 1$ corresponds to i-th eigenmode being critically damped, with larger values being overdamped, and smaller values being underdamped; $\eta_i = 1$ is the hysteretic damping ratio for the i-th eigenmode. Typical values of $\xi_i$ lie in the range $0.01 \leq \xi_i \leq 0.1$. Further, experimental methods for determining the damping factors $\xi_i$ and $\eta_i$ are discussed, amongst other examples, in Craig, R. R., Kurdila, A. J. *Fundamentals of Structural Dynamics*—2nd ed., John Wiley & Sons, Inc., (2006) and Girard, A. Roy, Nicolas. *Structural Dynamics in Industry*, John Wiley & Sons, Inc., (2008).

Modal damping provides a relatively accurate representation of damping for wide frequency ranges. All types of structural dynamic simulations, including non-linear transient dynamic analysis can benefit from utilizing modal damping. This was noted in Craig, R. R., Kurdila, A. J. *Fundamentals of Structural Dynamics*—2nd ed., John Wiley & Sons, Inc., (2006), and proved through study of relatively simple mechanical systems in several publications, such as Bianchi, J.-P, Balmes, E., Vermot G. des Roches, Bobillot A., "Using Modal Damping for Full Model Transient Analysis. Application to Pantograph-Catenary Vibration", *Proceedings of 24th International Coiference on Noise and Vibration engineering (ISMA 2010)*, (2010) and Korotkov, V. A., Ivanov, Naumkin, "Account of Modal Damping Instead of Rayleigh Damping in Floor Response Spectra Analysis in Civil Structures of Nuclear Power Plants (NPP) Under Aircraft Crash", *Proceedings of Simulia Customer Conference*, (2014). The modal damping matrices have a pre-defined and simple form in principal coordinates, corresponding to the reduced modal subspace that makes it natural and effective to use the modal damping matrices in the mode superposition. This was observed in Craig, R. R., Kurdila, A. J. *Fundamentals of Structural Dynamics*—2nd ed., John Wiley & Sons, Inc., (2006), Girard, A. Roy, Nicolas. *Structural Dynamics in Industry*, John Wiley & Sons, Inc., (2008) and Clough R. W., Penzien J., *Dynamics of structures*, 3rd ed., Computers & Structures, (2003). While it can be beneficial, solving structural dynamics problems with modal damping in physical coordinates poses significant computational challenges because the matrices $C_{modal}$ and $S_{modal}$ are "big" dense global matrices. Direct linear algebra solvers designed for sparse matrices cannot work effectively with the modal damping matrices.

Embodiments of the present invention provide methods and systems for solving dynamic problems with modal damping in the physical coordinates. Such methodologies require solving a system of linear equations with a matrix of the special form $A = B + \Psi G \Psi^T$, such as equation (32), described herein below. In the foregoing system of equations, the first matrix on the right hand side is the same as in the dynamic analysis without modal damping. The second term on the right hand side is a matrix of a relatively low rank that defines the modal damping. Embodiments effectively solve the system of equations with millions of unknowns with such a matrix.

Thus, embodiments of the present invention can be leveraged to effectively solve structural dynamic problems with modal damping in physical coordinates. Embodiments provide multiple approaches to solving a system of equations for modeling mechanical features of a structural dynamic system, such as the equation (31) noted herein below that is typical for use cases of dynamic analysis with modal damping in physical coordinates. One such approach is based on the Sherman-Morrison-Woodbury formula where, instead of using the formula directly (as show by equation 33), such an embodiment solves the expanded system of equations given by equation (34). Another embodiment of the present invention uses a preconditioned iterative method with the conventional operator without modal damping as a pre-conditioner to the iterative algorithm for solving the problem with modal damping.

Utilizing embodiments of the present invention provides techniques that allow realistic modeling of damping in structural dynamic systems with nonlinearities, frequency-dependent mechanical properties, and other advanced mechanical features that require the analysis to be performed in physical coordinates. This enables dynamic analyses with modal damping in physical coordinates for mechanical models with millions of degrees of freedom which is not available using existing finite element simulation techniques. Further, embodiments provide increased accuracy of engineering simulations because including modal damping yields a more realistic model of the system. Further still, embodiments provide greater computational efficiency with high performance scalable algorithms that include modal damping in the finite element dynamic analysis in the physical coordinate space.

By implementing such methodologies, embodiments provide realistic modeling for environments that is otherwise unavailable. For example, embodiments can be employed to implement modal damping in wide array of engineering simulations, including implicit time-integration dynamic analysis of a nuclear power plant, direct steady-state dynamic analysis for automotive noise, vibration, and harshness, and non-linear transient dynamic analysis of a car body, such as simulation of a door and hood slam, amongst others.

FIG. 1 is a flow chart of a method 110 of modeling mechanical features of a structural dynamic system according to an embodiment of the present invention. The method 110 begins by providing, in computer memory, a finite element model representing a structural dynamic system at step 111. In such an embodiment, the finite element model is programmed so as to have the properties of the structural dynamic system that the model represents. For example, the finite element model can be programmed to have mechanical properties such as velocity, acceleration, strain, stress, frequency, density, vibration, displacement, and force, amongst others, of the structural system. Further, the finite element model can be programmed to have energy dissipation properties such as viscous damping, structural damping, dry friction, nonlinear connections and interactions, and other non-conservative forces. Likewise, the model provided at step 111 may represent any structural dynamic system known in the art, such as an automotive noise and vibration system, an automotive durability system, an airspace dynamics system, and a seismic system. Likewise, the model can represent engineering systems in other industrial application areas such as engineering equipment, electronics, and life sciences, amongst others.

According to an embodiment, the finite element model may be attained in computer memory through any means known in the art. For example, by transferring the finite element model from any communicatively coupled point to the computer memory. In yet another embodiment, the model is created by a user using conventional model generation techniques. Further still, according to yet another embodiment, a three-dimensional CAD model of the structural dynamic system is attained and then through use of one or more available modeling software packages, the 3D CAD model is converted to a finite element model. Further, in an embodiment of the method 110 implemented in a computing device, the memory on which the finite element model is provided may be at any communicatively coupled point in relation to the computing device, e.g. remotely or locally located.

After providing the finite element model at step 111, the method 110 continues and a processor coupled to the memory solves a system of equations with a first term that represents a linear combination of a mass, a stiffness, and a damping of the finite element model and a second term representing modal damping at step 112. In the method 110, the system of equations is solved at step 112 using the Sherman-Morrison-Woodbury formula or a preconditioned iterative method. According to an embodiment, the properties, e.g. mass, stiffness, and damping of the finite element model, may be automatically derived from the finite element model provided at step 111. In another embodiment, a user provides the necessary elements of mass, stiffness, and damping to be included in the system of equations. Similarly, the user may provide the properties of the term representing the modal damping. Further still, in an embodiment, the user can control modal damping usage during the analysis, for instance, by including or excluding the modal damping from the analysis at different steps. For example, the user can run perform an analysis for a model with and without modal damping to see the effect of damping on the results.

According to an embodiment of the method 110, solving the system of equations at step 112 using the Sherman-Morrison-Woodbury formula comprises expanding a matrix of the system of equations by including an auxiliary vector of unknowns to a set of unknowns of the system of equations. In such an embodiment, the auxiliary vector has a size equivalent to the number of eigenmodes used in the second term representing the modal damping. Further detail regarding solving the aforementioned expanded matrix is described herein below.

According to an embodiment of the method 110, the system of equations may be solved at step 112 using an iterative method. Embodiments of the method 110 may use any iterative method known in the art. For example, embodiments may use the Richardson iterative scheme, a preconditioned minimal residual method, a conjugate gradient method, and a generalized minimal residual method, amongst others. The proposed choice for the preconditioner supports good convergence for a wide variety of iterative schemes. Thus, selecting a particular iterative method does not make a principal difference and the iterative method can be chosen based on analysis software availability, development effort estimates, or some other preferences not directed related to embodiments of the inventions. In order to increase efficiency in solving the system of equations at step 112, an embodiment of the method 110 uses a preconditioner in the iterative method. According to an embodiment, the preconditioner utilizes the first term of the system of equations, representing the linear combination of a mass, a stiffness, and a damping of the finite element model without modal damping, as the preconditioner.

As noted herein, the method 110 uses the Sherman-Morrison-Woodbury formula or an iterative method at step 112 to solve the system of equations. A further embodiment of the method 110 determines what method of the two to use in solving the system of equations at step 112. In such an embodiment, the determination is based upon analysis software availability, development effort estimates, or some other preferences including the typical finite element problem size. It is likely that the iterative approach is more effective than the approach based on the Sherman-Morrison-Woodbury formula for large-scale finite element simulations with millions of degrees of freedom. However, the area of effective application of both approaches strongly depends on the implementation including parallelization of the algorithms for distributed memory systems, symmetric multi-processing systems, and using graphic processors (GPU) for high performance computing.

The method 110 continues at step 113 and forms an improved 3D model of a real-world object represented by the finite element model utilizing results generated from solving the system of equations with the finite element mode and modal damping to model mechanical features of the represented structural dynamic system. In other words, results of solving the system of equations from step 112 are used at step 113 to inform design changes to a model of the structural dynamic system. For example, if the structural dynamic system represents a car, and the simulation models slamming the car door, results may show that over time there are quality issues with the current door hinges. Such a point of failure can be identified through use of the method 110 and changes, such as changing the material of the hinges or the welds adhering the hinges to the door frame may be made in a CAD model of the car to improve upon the design.

As noted herein, the method 110 is computer implemented. Thus, it may be implemented in a computing device utilizing any methods known in the art. For example, the method may be carried out by executing program code stored on the computing device. Further, in an embodiment, the method 110 may be implemented in an existing linear equation solver that already exists. In such an embodiment, the existing linear solver is modified to carry out the steps 111-113 of the method 110. According to an alternative embodiment, wherein the method is implemented using an existing linear solver, the step 111 and step 112 of providing, and solving, respectively, are incorporated in an existing linear solver which is communicatively coupled to a 3D modeling software program to facilitate improving the 3D model using results of the solving performed at step 112. Further still, an embodiment may implemented by modifying an existing linear solver to perform the solving 112 according the principles described herein where the existing linear solver can access the finite element model provided at step 111 and can access a 3D model, so as to improve the model at step 113.

As described herein, embodiments of the present invention provide methods for modeling mechanical features of a structural dynamic system. One such modeling technique that may employ embodiments described herein is frequency response analysis with modal damping. The steady state dynamic problem of frequency response analysis with modal damping has the form below given by equation (22):

$$[-\omega^2 M + i\omega(C+C_{modal}) + K + i(S+S_{modal})]U = F \quad (22)$$

where M, K, C, and S are the general global sparse mass, stiffness, viscous damping, and structural damping matrices, respectively; $C_{modal}$ and $S_{modal}$ are the modal viscous damping and modal structural damping matrices defined in equation (17). Equation (22) can be re-written in the form:

$$[B + \Psi(i\omega D + iH)\Psi^T]U = F \quad (23)$$

with $$B = -\omega^2 M + i\omega C + K + iS \quad (24)$$

Yet another simulation that can be implemented using principles of the present invention is non-linear transient analysis with viscous modal damping. The general equation (1) can be modified by adding the modal damping term on the left side, yielding equation (25) below:

$$J(u,\dot{u}) + P(u,\dot{u}) + C_{modal}\dot{u} = f(t) \quad (25)$$

Explicit time-integration can be used in such an embodiment, where the modal damping term is calculated on the right hand side of the equation (7) giving equation 26.

$$\ddot{u}_n = M^{-1}(u_n)[f(t_n) - P(u_n,\dot{u}_n) - \Psi D \Psi^T \dot{u}_n] \quad (26)$$

Embodiments for modeling non-linear transient problems with viscous modal damping may also utilize an implicit time-integration methodology. Applying an implicit integration algorithm, for example, the aforementioned α-method, yields the modal damping terms in the operator. For example, the system of equations (12) at the k-th iteration of the Newton method for the n+1-th time step takes the form:

$$\left[B_{n+1}^{(k)} + \Psi\left(\frac{(1+\alpha)\gamma}{\beta \Delta t_{n+1}}D\right)\Psi^T\right]\Delta u_{n+1}^{(k)} = b_{n+1}^{(k)}, u_{n+1}^{(k)} = u_{n+1}^{(k-1)} + \Delta u_{n+1}^{(k)} \quad (27)$$

where $$B_{n+1}^{(k)} = \frac{\partial R}{\partial u_{n+1}}(u_{n+1}^{(k-1)}), \quad (28)$$

$$b_{n+1}^{(k)} = -R(u_{n+1}^{(k-1)}) - \Psi D \Psi^T \left[\frac{(1+\alpha)\gamma}{\beta \Delta t_{n+1}}(u_{n+1}^{(k-1)} - u_n) - \left(\frac{\gamma}{\beta} - 1 + \frac{\alpha\gamma}{\beta} - 2\alpha\right)\dot{u}_n - (1+\alpha)\left(\frac{\gamma}{2\beta} - 1\right)\Delta t_{n+1}\ddot{u}_n\right]$$

and R($u_{n+1}$) is defined by equation (11).

If the mechanical nature of the structural system being simulated is such that non-linearity does not significantly affect the eigenmodes, then the modal damping matrix that multiplies ü on the left hand side of equation (25) can be calculated from the initial underformed state of the finite element model and kept constant during the analysis. However, in many practical cases, the eigenmodes depend on a non-linear deformed configuration of the model. Such a dependency can be taken into account by re-calculating the modal damping matrix after several steps of the time integration algorithm. Such re-calculation includes solving the eigenproblem for the current deformed state of the structure.

Yet another modeling analysis that can be performed using principles of the present invention is the linear transient problem with viscous modal damping. In such an analysis, while using the α-method, the system of equations (29) is solved at each time of the implicit integration algorithm.

$$\left[B_{n+1} + \Psi\left(\frac{(1+\alpha)\gamma}{\beta \Delta t_{n+1}}D\right)\Psi^T\right]u_{n+1} = b_{n+1} \quad (29)$$

where $$B_{n+1} = \frac{1}{\beta \Delta t_{n+1}^2}M + \frac{(1+\alpha)\gamma}{\beta \Delta t_{n+1}}C + (1+\alpha)K, \quad (30)$$

$$b_{n+1} = (1+\alpha)f(t_{n+1}) - \alpha f(t_n) + M\left[\frac{1}{\beta \Delta t_{n+1}^2}u_n + \frac{1}{\beta \Delta t_{n+1}}\dot{u}_n + \left(1 - \frac{1}{2\beta}\right)\ddot{u}_n\right] + (C + \Psi D \Psi^T)\left[\frac{(1+\alpha)\gamma}{\beta \Delta t_{n+1}}u_n + \left(\frac{\gamma}{\beta} - 1 + \frac{\alpha\gamma}{\beta} - 2\alpha\right)\dot{u}_n + (1+\alpha)\left(\frac{\gamma}{2\beta} - 1\right)\Delta t_{n+1}\ddot{u}_n\right] + \alpha K u_n$$

If the time increment is constant, $\Delta t_{n+1} = \Delta t = $ const, then the matrix $B_{n+1}$ does not change from step to step and can be taken into account in the solution algorithm implementation as it was noted hereinabove.

Described hereinabove are various modeling techniques, for example, frequency response analysis, a non-linear transient problem, and a linear transient problem that can incorporate modal damping yielding the systems of equations (23), (27), and (29) that can be solved utilizing principles of an embodiment of the invention. Equations (23), (27), and (29) show that solving the frequency response or transient dynamic problems with modal damping in physical coordinates requires solving a system of linear equations where $$Ax = b \quad (31)$$

where the matrix A has the special form $$A = B + \Psi G \Psi^T \quad (32)$$

Dynamic solution performance depends mostly on solving such systems of equations. On the right hand side of equation (31) B is a "conventional" operator of the direct solution method for problems without the modal damping, and the second term is related to the modal damping. The matrix B represents a linear combination of the mass, stiffness, and damping operators of the finite element model in the space of physical coordinates. Therefore, by the nature of the finite element method, B is a "big" n×n sparse matrix. Modern algorithms and software can very effective solve systems of linear equations with matrices of such structure. For example, in performing dynamic analyses without modal damping. In the modal damping term on the right hand side of equation (32) the matrix P is a "tall" n×m dense matrix representing the matrix of the eigenmodes multiplied with the global mass operator, and G is a "small" m×m nonsingular matrix defining the modal damping in the modal space. The matrix G can be dense, but usually, it is diagonal. Here n is the number of degrees of freedom of the finite element model which can be in the millions or tens of millions, and m is the number of eigenmodes used for the modal damping definition which can be in the thousands. As noted hereinabove, practical engineering simulations solving the system of equations (31) cannot be effectively calculated using high performance linear equation solvers designed to work with sparse matrices because $\Psi G \Psi^T$ is a "big" dense matrix. Thus, embodiments of the present invention, such as the method 110 described hereinabove, provide methods to solve the system of equations (32).

As described hereinabove in relation to FIG. 1, embodiments may solve a system of equations for modeling a structural dynamic system using the Sherman-Morrison-Woodbury formula or a preconditioned iterative method. Below, further detail in the form of an example of each methodology is described in solving the system of equations (31, 32). These approaches provide a high performance scalable implementation for symmetric multiprocessing systems and therefore, allow effective solution of large scale structural dynamics problems with modal damping in physical coordinates.

The direct solution based on the Sherman-Morrison-Woodbury formula utilizes the structure of the matrix A and re-writes the solution to equation (31) using the Sherman-Morrison-Woodbury formula yielding the equation (33) below. Further detail on the Sherman-Morrison-Woodbury formula is described in Hager W. W. "Updating the inverse of a matrix", SIAM Review, vol. 31, No. 2, pp. 221-239, (1989) and Higham, N., *Accuracy and Stability of Numerical Algorithms*, 2nd ed. SIAM, (1996).

$$x = B^{-1}b - B^{-1}\Psi(G^{-1} + \Psi^T B^{-1}\Psi)^{-1}\Psi^T B^{-1}b \qquad (33)$$

To solve equation (33) it can be assumed that the matrices $G^{-1}$ and $\Psi = M\Phi$ are pre-calculated, and without loss of generality it can be assumed that the matrix B is positive definite: $B = B^T$, $B > 0$. The typical way to solve equation (33) using the Sherman-Morrison-Woodbury formula includes the following operations:
(1) Factorize the matrix B: $B = LL^T$
(2) Solve a system with the factorized matrix: $By = b$
(3) $z = \Psi^T y$
(4) $u = (G^{-1} + \Psi^T B^{-1}\Psi)^{-1} z$
   a) Perform the forward reduction with multiple right hand sides: $Q = L^{-1}\Psi$
   b) $R = Q^T Q$
   c) Solve: $(G^{-1} + R)u = z$
(5) $v = \Psi u$
(6) Solve a system with the factorized matrix: $Bw = v$
(7) $x = y - w$ The aforementioned steps (1) and (2) are always presented when calculating the direct solution, but steps (3) to (7) are specific for modal damping and step (4) is the most computationally intensive amongst them. In embodiments of the present invention, instead of using steps (1) to (7) for solving equation (33), embodiments of the present invention utilize a methodology of solving the system of equations with an expanded matrix, given by equation (34)

$$\begin{bmatrix} B & \Psi \\ \Psi^T & -G^{-1} \end{bmatrix} \begin{Bmatrix} x \\ y \end{Bmatrix} = \begin{Bmatrix} b \\ 0 \end{Bmatrix} \qquad (34)$$

where y is an auxiliary unknown vector of size m. The matrix blocks on the left hand side of equation (34) are, respectively: B—operator of the direct dynamic solution method for problems without the modal damping; $\Psi$—the matrix of eigenmodes multiplied with the global mass operator from the left; G—the modal damping operator in the modal domain.

One can check that the vector x coming from the solution of system of equations (34) satisfies equation (33) and therefore, it represents the solution of equation (31). While the total floating point operation count utilizing the steps (1) to (7) and solving the system of equations (34) are roughly the same, using equation (34) is more suitable for effective usage of symmetric multiprocessing systems and for computations with graphic processors (GPGPU). Practically all calculations with the expanded matrix bordering block $\Psi$ can be implemented in the form of highly effective BLAS3-level operations, as described in Demmel J. W. Applied Numerical Linear Algebra, SIAM (1997), on the matrix blocks. In embodiments, the number times the factor L has to be accessed is equal to one compared to three in steps (1) to (7).

Further, available high performance linear equation solvers can be utilized for solving the system of equations (34) with few changes. Thus, formulation (34) provides a method of solving a structural dynamics problem with modal damping in physical coordinates that can be achieved without costly software development work. Moreover, in the case of the linear dynamic analysis with the constant time step, the matrix on the left hand side of equation (34) or the matrix B when performing steps (1) to (7) should be factorized only once per dynamic analysis which makes the solution much more efficient.

Yet another embodiment of the present invention solves a system of equations for modeling a structural dynamic system using an iterative method. Direct algorithms using the Sherman-Morrison-Woodbury formula can become computationally ineffective in large scale dynamic analyses for finite element models with millions of degrees of freedom when the number of eigenmodes used for defining the modal damping is high, e.g., in the thousands. For such situations, embodiments may solve the system of equations, e.g., equation (31), using an iterative method, such as those described in Bakhvalov, N. S., *Numerical Methods: Analysis, Algebra, Ordinary Differential Equations*, MIR, (1997), Saad, Y., *Iterative Methods for Sparse Linear Systems*, SIAM, (2003), van der Vorst, H. A., *Iterative Krylov Methods for Large Linear Systems*, Cambridge University Press, (2003), and Demmel J. W. Applied Numerical Linear Algebra, SIAM (1997).

In such an embodiment, the operator of the direct dynamic solution method for problems without the modal damping, the matrix B, can be used as a preconditioner. Matrices A and B differ only by the modal damping term that is defined on a relatively "small" m-dimensional subspace of the n-dimensional space. Thus, the operator B is "close" to the operator A and can be a "good" preconditioner to the iterative scheme for solving equation (31). This is particularly true if the level of the modal damping is not high.

This concept can be proven by considering linear transient modal analysis with modal damping, as presented above in equations (29) and (30). For simplicity, it can be assumed that the time increment is constant: $\Delta t_n = \Delta t$, and there are no other sources of damping in the model except the modal damping with the constant damping factor $\xi_i = \xi$, i = 1, ..., m. With these assumptions, the matrices A and B take the form:

$$A = \frac{1}{\beta \Delta t^2} M + (1+\alpha)K + M\Phi_m \left(2\xi \frac{(1+\alpha)\gamma}{\beta \Delta t} \Omega_m\right) \Phi_m^T M, \quad (35)$$

$$B = \frac{1}{\beta \Delta t^2} M + (1+\alpha)K$$

An example where the preconditioned Richardson iterative scheme is used for solving equation (31) yields equation (36) below:

$$x^{(k+1)} = x^{(k)} - \tau B^{-1}(Ax^{(k)} - b) \quad (36)$$

where $\tau$ is a scalar parameter that has to be chosen such that the sequence of $x^{(k)}$ converges. Then, let $x = A^{-1}b$ be the exact solution of equation (31), which then yields the equation (37) below:

$$(x^{(k+1)} - x) = (I - \tau B^{-1}A)(x^{(k)} - x) \quad (37)$$

where $r^{(k)} = x^{(k)} - x$ is the error vector, and the convergence estimate can be written as $$\|x^{(k)} - x\|_2 \leq \rho^k \|x^{(0)} - x\|_2 \quad (38)$$

where $\|\cdot\|_2$ is Euclidian norm $\|v\|_2 = \sqrt{v^T v}$, and the convergence factor $\rho = \rho_{I-\tau B^{-1}A}$ is the spectral radius of the operator $I - \tau B^{-1}A$.

It is known, as described in Bakhvalov, N. S., *Numerical Methods: Analysis, Algebra, Ordinary Differential Equations*, MIR, (1997) and Saad, Y., *Iterative Methods for Sparse Linear Systems*, SIAM, (2003), that the optimal rate of convergence of the Richardson iterative scheme is achieved with the following optimal parameter that gives the following corresponding optimal spectral radius $$\tau_{opt} = \frac{1}{\mu_{min} + \mu_{max}}, \rho_{opt} = \frac{\mu_{max} - \mu_{min}}{\mu_{max} + \mu_{min}} \quad (39)$$

where $\mu_{min}$ and $\mu_{max}$ are the minimal and the maximal eigenvalues of the matrix $B^{-1}A$.

To estimate $\mu_{min}$ and $\mu_{max}$ let n×n matrices $\Phi$ and $\Omega$ be a solution of the full symmetric eigenvalue problem as shown by equation (40) below:

$$K\Phi = M\Phi\Omega^2, \Phi^T M\Phi = I \quad (40)$$

Matrices $\Phi$ and $\Omega = \text{diag}(\omega_1, \ldots, \omega_n)$ contain the solution of the eigenproblem (16) $\Phi_{1\ldots m}$ and $\Omega_{1\ldots m}$ as sub-matrices $$\Phi = [\Phi_{1\ldots m} \; \Phi_{m+1\ldots n}], \Omega = \begin{bmatrix} \Omega_{1\ldots m} & 0 \\ 0 & \Omega_{m+1\ldots n} \end{bmatrix} \quad (41)$$

Using equations (35) and (40) it be written that $$\Phi^T A\Phi = \Lambda_A, A = (\Phi^T)^{-1}\Lambda_A \Phi^{-1},$$

$$\Phi^T B\Phi = \Lambda_B, B^{-1} = \Phi\Lambda_B^{-1}\Phi^T,$$

$$(B^{-1}A)\Phi = \Phi(\Lambda_B^{-1}\Lambda_A) \quad (42)$$

where $\Lambda_A = \text{diag}(\lambda_1^A, \ldots, \lambda_n^A)$ and $\Lambda_B = \text{diag}(\lambda_1^B, \ldots, \lambda_n^B)$ with the diagonal values $$\lambda_i^B = \frac{1}{\beta \Delta t^2} + (1+\alpha)\omega_i^2, i = 1, \ldots, n; \quad (43)$$

-continued $$\lambda_i^A = \begin{cases} \lambda_i^B + 2\xi \frac{(1+\alpha)\gamma}{\beta \Delta t}\omega_i, & i = 1, \ldots, m \\ \lambda_i^B, & i = m+1, \ldots, n \end{cases}$$

Therefore, the matrix $B^{-1}A$ has real eigenvalues given by (44)

$$\mu_i = \frac{\lambda_i^A}{\lambda_i^B} = \begin{cases} 1 + 2\xi(1+\alpha)\gamma \frac{\omega_i \Delta t}{1 + (1+\alpha)\beta(\omega_i \Delta t)^2} & i = 1, \ldots, m \\ 1 & i = m+1, \ldots, n \end{cases} \quad (44)$$

The minimal eigenvalue $\mu_{min} = 1$. Treating the right hand side of equation (44) as a function of $\omega \Delta t$ the maximal value $\mu_* = \mu(\omega_* z \Delta t)$ is determined where $$\mu_* = 1 + \gamma \sqrt{\frac{1+\alpha}{\beta}}, \omega_* \Delta t = \frac{1}{\sqrt{\beta(1+\alpha)}} \quad (45)$$

Allowable parameter values of the Hilber, Hughes, and Taylor dynamic integration algorithm, are noted in Abaqus Theory Guide, Release 6.14. Dassault Systèmes, (2014), Hilber, H. M., Hughes, T. J. R., Taylor, R. I., "Improved Numerical Dissipation for Time Integration Algorithms in Structural Dynamics", *Earthquake Engineering and Structural Dynamics*, Vol. 5, pp. 283-292, (1977), and Hilber, H. M., Hughes, T. J. R., "Collocation, Dissipation and 'Overshoot' for Time Integration Schemes in Structural Dynamics," *Earthquake Engineering and Structural Dynamics*, vol. 6, pp. 99-117, (1978), $$-\frac{1}{2} \leq \alpha \leq 0, 0 < \beta < 1, \gamma \geq \frac{1}{2} \quad (46)$$

and with the time step satisfying the accuracy criterion $$\frac{\Delta t}{T} < \frac{1}{10}$$

for the m-th natural vibration mode, it yields $$\omega_m \Delta t \leq \frac{2\pi}{10} < 1 < \frac{1}{\sqrt{\beta(1+\alpha)}} = \omega_* \Delta t \quad (47)$$

As the function $\mu(\omega \Delta t)$ is monotone increasing for $0 \leq \omega \Delta t < \omega_* \Delta t$ it can be concluded that $$\mu_{min} = 1, \quad (48)$$

$$\mu_{max} = 1 + 2\xi(1+\alpha)\gamma \frac{\omega_m \Delta t}{1 + (1+\alpha)\beta(\omega_m \Delta t)^2} =$$

$$1 + \frac{4\xi(1+\alpha)\gamma\pi\delta}{1 + 4(1+\alpha)\beta(\pi\delta)^2}, \delta \leq \frac{1}{10}$$

Here parameter $\delta$ is the time integration accuracy factor that defines the time increment relatively to the period of the m-th natural vibration mode:

$$\Delta t = \delta \frac{2\pi}{\omega_m}.$$

Using equation (48) and by making a transformation, the optimal parameter and corresponding rate of convergence (39) of the iterative scheme (36) can be expressed in the form $$\tau_{opt} = \frac{1}{\mu_{max} + \mu_{min}} = \frac{1 + 4(\pi\delta)^2(1+\alpha)\beta}{2 + 4\pi\delta(1+\alpha)(\gamma\xi + 2\pi\delta\beta)} \quad (49)$$

$$\rho_{opt} = \frac{\mu_{max} - \mu_{min}}{\mu_{max} + \mu_{min}} = \frac{2\pi\delta(1+\alpha)\gamma\xi}{1 + 2\pi\delta(1+\alpha)(\gamma\xi + 2\pi\delta\beta)}$$

In (49), the optimal iterative parameter can be calculated using the time integrator parameters, time increment, and maximal natural frequency used in the modal damping definition.

The above described processes can be implemented in any embodiment of the present invention. For example, the Sherman-Morrison-Woodbury solution method described in relation to equation (34) and the iterative methods described in relation to equation (36) can be implemented at step 112 of the method 110 described hereinabove in relation to FIG. 1.

Figure 2A:
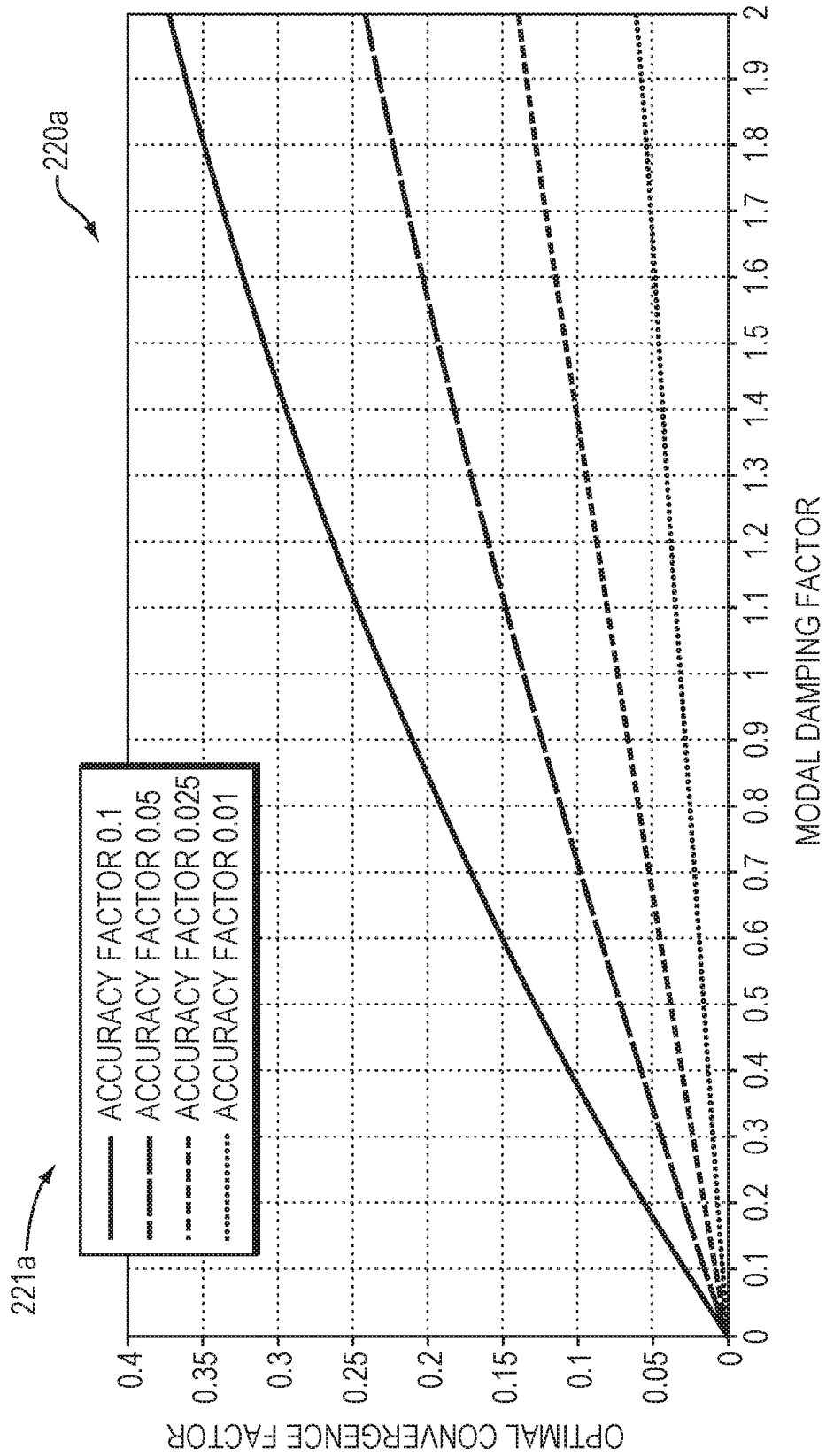
FIGS. 2A-B are graphs illustrating improvements in convergence achieved in modeling a structural dynamic system utilizing principles of embodiments of the present invention.
Figure 2B:
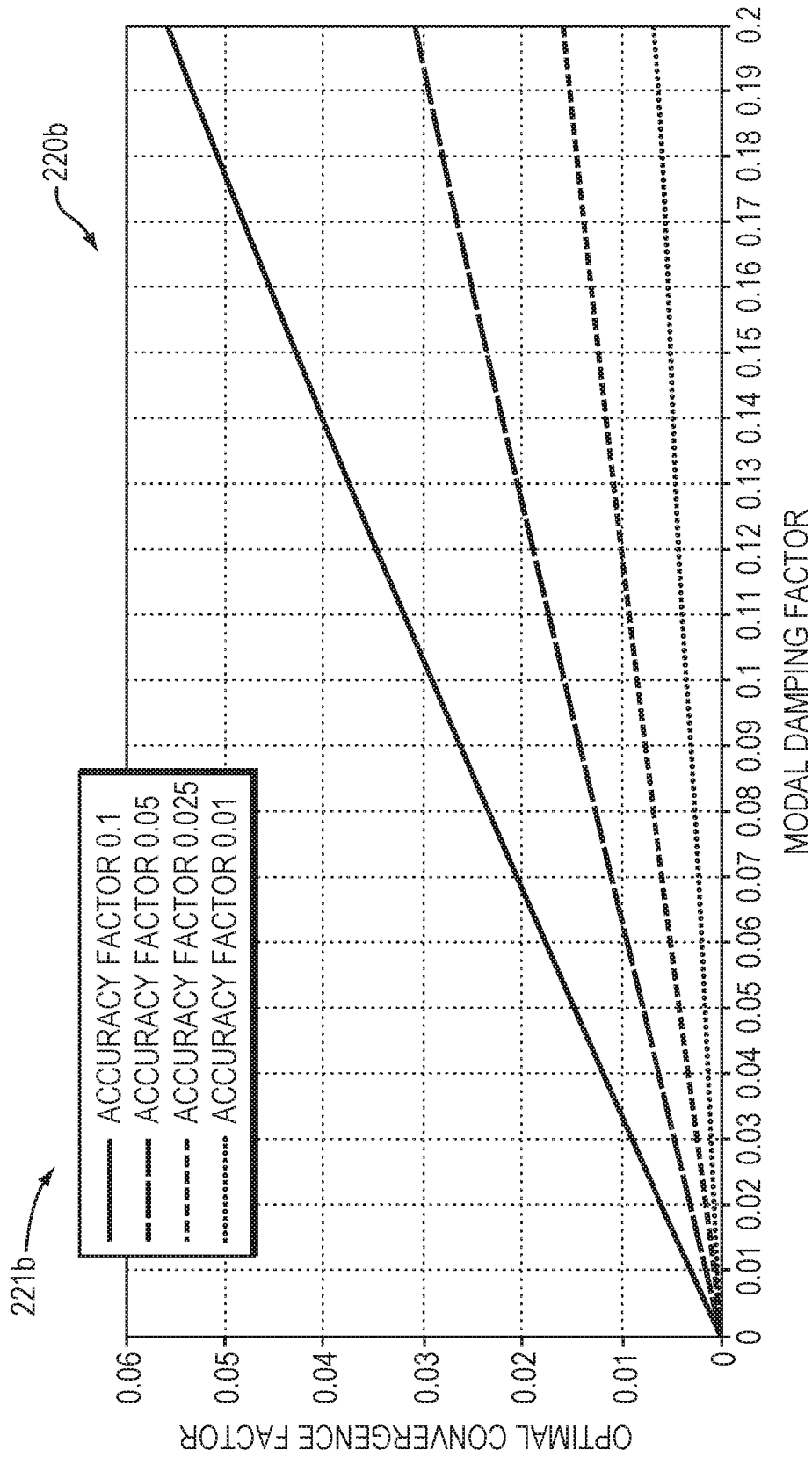

FIGS. 2A and 2B are graphs 220a and 220b illustrating estimated values of the optimal convergence factor $\rho_{opt}$, shown by the lines 221a and 221b, computed for different values of the modal damping factor $\xi$ and the accuracy factor $\delta$ with the typical parameter settings of the Hilber, Hughes, and Taylor time integrator as described in Abaqus Theory Guide, Release 6.14. Dassault Systèmes, (2014), where $$\alpha = -0.05, \beta = 0.275625, \gamma = 0.55 \quad (50)$$

FIG. 2A shows $\rho_{opt}$ for $$0 \leq \xi \leq 2, \frac{1}{100} \leq \delta \leq \frac{1}{10}.$$

FIG. 2B shows a zoomed in version of FIG. 2A with the modal damping factor in the range $0 \leq \xi \leq 0.2$. FIGS. 2A and 2B show that better convergence is achieved for the lower level of the modal damping and for the smaller values of the time increment. For the most typical range, $0.01 \leq \xi \leq 0.1$, the convergence factor is below 0.03 for the largest reasonable time increment that indicates very fast convergence of the iterative scheme.

Embodiments of the present invention can be analyzed by examining the number of iterations for obtaining a solution. Using the inequalities $\|v\|_\infty \leq \|v\|_2 \leq \sqrt{n}\|v\|_\infty$ where $$\|v\|_\infty = \max_{1 \leq i \leq n}|v_i|,$$

the inequality (51) can be obtained from equation (38)

$$\|x^{(k)} - x\|_\infty \leq \rho^k \sqrt{n} \|x^{(0)} - x\|_\infty \quad (51)$$

If the initial vector is zero: $x^{(0)} = 0$, the inequality (51) yields:

$$\log_{10}\left(\frac{\|x\|_\infty}{\log_{10}\|x^{(k)} - x\|_\infty}\right) \geq k(-\log_{10}\rho) - \log_{10}\sqrt{n} \quad (52)$$

The left hand side of (52) estimates the number of correct decimal places of the solution. Therefore, the number of iterations for obtaining a solution with N correct decimal places is estimated as $$k \geq \frac{N + \frac{1}{2}\log_{10}n}{(-\log_{10}\rho)} \quad (53)$$

Figure 3A:
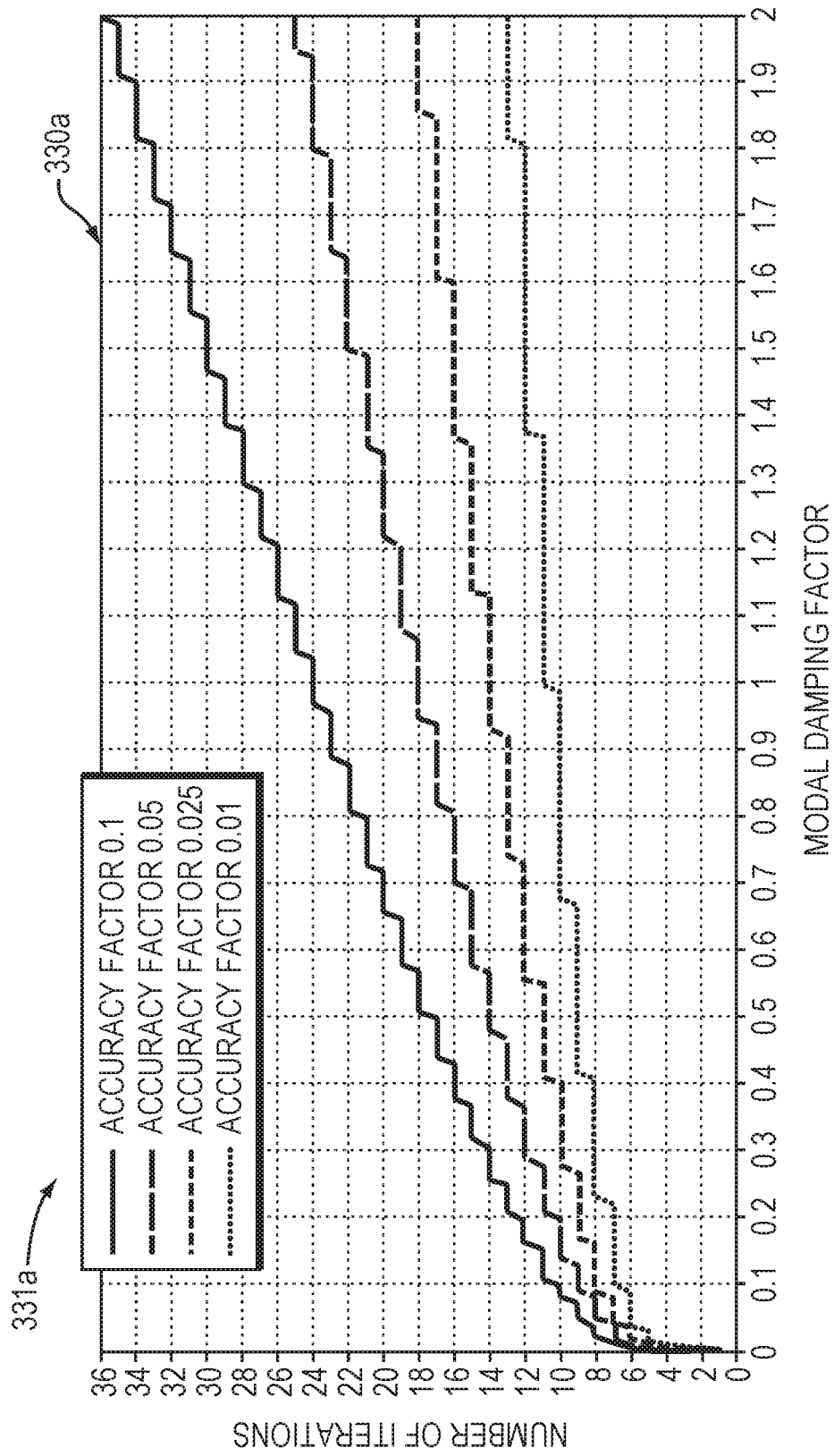
FIGS. 3A-B are graphs depicting the estimated number of iterations needed to solve a structural dynamic system according to embodiments of the present invention.
Figure 3B:
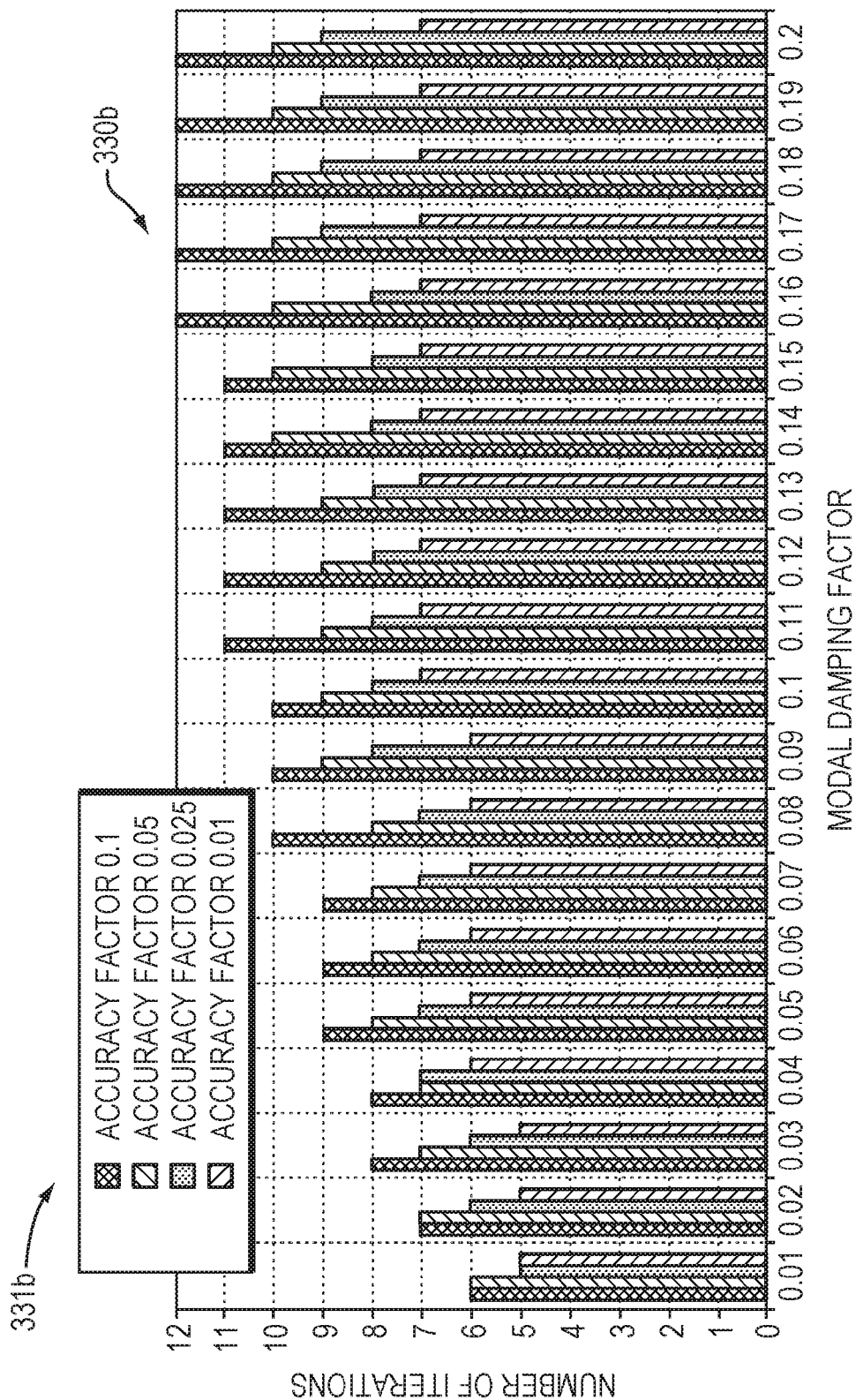

FIGS. 3A and 3B are the graphs 330a and 330b, respectively, which illustrate the estimated number of iterations with the optimal convergence factor $\rho_{opt}$ for obtaining a solution to a structural dynamic modeling problem with 12 correct decimal places for a finite element model with a million degrees of freedom, $n = 10^6$, for different values of the modal damping factor $\xi$, accuracy factors $\delta$ 331a and 331b, and with the time integrator parameter settings (46).

FIG. 3A depicts the number of iterations for $$0 \leq \xi \leq 2, \frac{1}{100} \leq \delta \leq \frac{1}{10}.$$

FIG. 3B zooms into the modal damping factor range $0 \leq \xi \leq 0.2$. Both FIGS. 3A and 3B show that fewer iterations are needed for smaller modal damping factors and time increments. FIG. 3B shows that for the modal damping factor range $0.01 \leq \xi \leq 0.2$ the number of correct decimal places in the solution increases, at least by one per iteration.

FIGS. 2A, 2B, 3A, and 3B depict results from investigating convergence of the preconditioned Richardson iterative scheme for a special case of the linear dynamic problem with modal damping and derived formulas for the optimal iterative parameter and convergence factor. The determined estimates demonstrate good convergence of the iterative process for the practical range of the modal damping factor. In the general case, better convergence of the iterative solution can be obtained by using more advanced preconditioned iterative methods such as preconditioned minimal residual method, conjugate gradient method, generalized minimal residual method etc. These methods are described in Saad, Y., *Iterative Methods for Sparse Linear Systems*, SIAM, (2003), van der Vorst, H. A., *Iterative Krylov Methods for Large Linear Systems*, Cambridge University Press, (2003), and Demmel J. W. Applied Numerical Linear Algebra, SIAM (1997). Similarly good convergence of the iterative algorithms can be achieved for solving the system of equations (31) in nonlinear dynamic analyses with the moderate level of nonlinearity. Therefore, the operator of the direct dynamic solution method for problems without the modal damping represents a good preconditioner for iterative solution of dynamic problems with modal damping in physical coordinates Embodiments described herein present two approaches for solving a system of equations (31) that can be used to calculate solutions of the structural dynamics problems with modal damping in physical coordinates. In the frequency response analysis problems, the Sherman-Morrison-Woodbury technique, based on equation (34) can be used to solve equations of motion with the modal damping term in the frequency domain (23). The operator, right hand side, and solution of equation (34) for this case are complex matrix and vectors, respectively. It is best to not utilize the iterative methods to solve the frequency response analysis problems because the matrix B (24) is not positive definite in the general case.

Transient dynamic response of the models with the modal damping can be calculated by using the Sherman-Morrision-Woodbury methodology or the iterative methods. In the linear dynamic analyses with modal damping, the system of equations at every time step (29) has the form (31), and can be solved using the aforementioned Sherman-Morrison-Woodbury formulation with the expanded form (34) or by using a preconditioned iterative method. In both cases the conventional dynamic operator B (without the modal damping) of the implicit time integration method is formed, and matrices $\Psi$ and G defining the modal damping are used in the matrix operations required for the solution calculation in physical coordinates by the Sherman-Morrison-Woodbury or iterative method.

In the case of nonlinear dynamic simulations with modal damping, the system of linear equations (27) is solved at every time step for every iteration of the Newton (or similar) method for obtaining the non-linear dynamic solution. System of equations (27) also has form (31) and can be solved effectively by the Sherman-Morrison-Woodbury technique or using the iterative methods similarly to the linear analysis case.

Choosing the Sherman-Morrison-Woodbury technique or the iterative approach for solving the transient dynamic problem effectively can be based on practical experience, available hardware, the finite element model size, and modal damping level and non-linearity of the model. The iterative method may be more economical than the Sherman-Morrison-Woodbury technique for very large finite element systems (millions degrees of freedom) with moderate levels of nonlinearity when very many (thousands) eigenmodes are used to define the modal damping.

Figure 4:
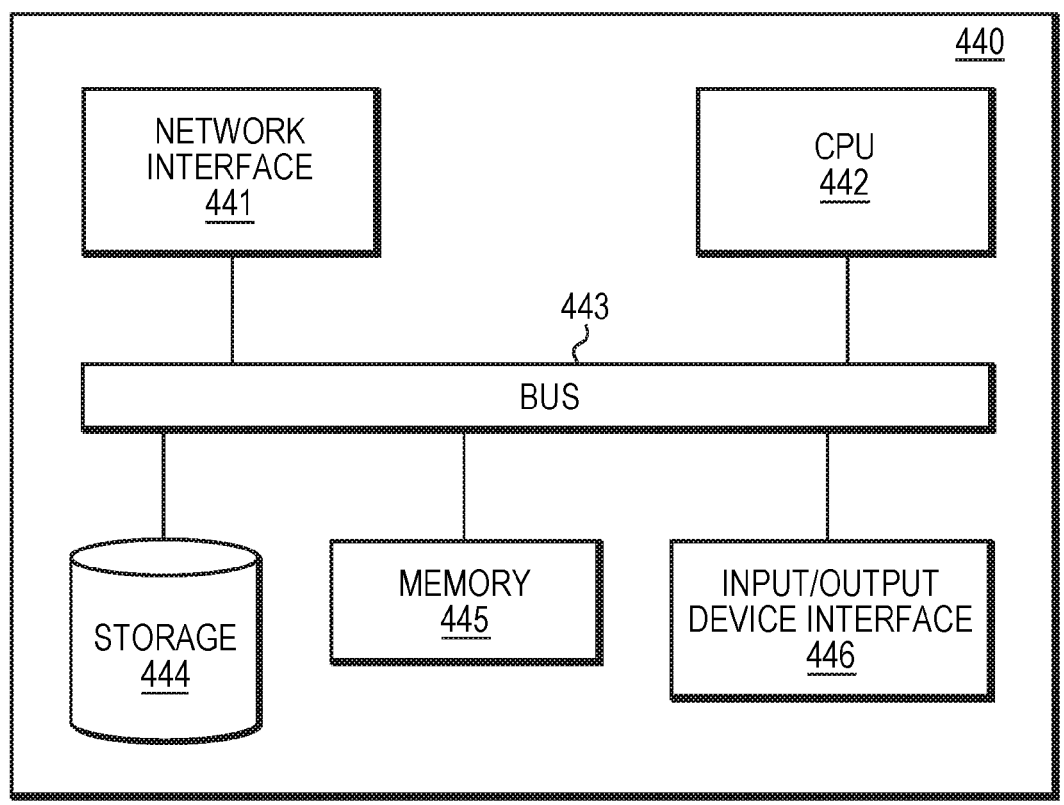
FIG. 4 is a simplified block diagram of a computer system for modeling mechanical features of a structural dynamic system according to an embodiment.

FIG. 4 is a simplified block diagram of a computer-based system 440 that may be used to model mechanical features of a structural dynamic system according to an embodiment of the present invention. The system 440 comprises a bus 443. The bus 443 serves as an interconnect between the various components of the system 440. Connected to the bus 443 is an input/output device interface 446 for connecting various input and output devices such as a keyboard, mouse, display, speakers, etc. to the system 440. A central processing unit (CPU) 442 is connected to the bus 443 and provides for the execution of computer instructions. Memory 445 provides volatile storage for data used for carrying out computer instructions. Storage 444 provides non-volatile storage for software instructions, such as an operating system (not shown). The system 440 also comprises a network interface 441 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 440, or a computer network environment such as the computer environment 550, described herein below in relation to FIG. 5. The computer system 440 may be transformed into the machines that execute the methods (e.g., 110) described herein, for example, by loading software instructions into either memory 445 or non-volatile storage 444 for execution by the CPU 442. One of ordinary skill in the art should further understand that the system 440 and its various components may be configured to carry out any embodiments of the present invention described herein. Further, the system 440 may implement the various embodiments described herein utilizing any combination of hardware, software, and firmware modules operatively coupled, internally, or externally, to the system 440.

Figure 5:
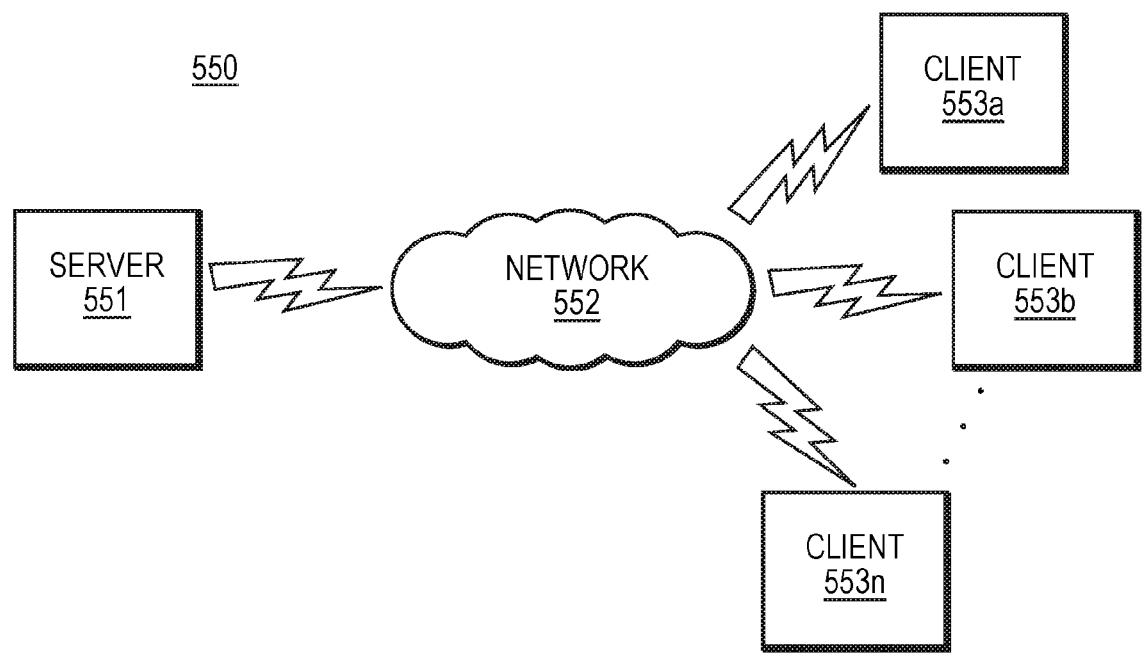
FIG. 5 is a simplified diagram of a computer network environment in which an embodiment of the present invention may be implemented.

FIG. 5 illustrates a computer network environment 550 in which an embodiment of the present invention may be implemented. In the computer network environment 550, the server 551 is linked through the communications network 552 to the clients 553a-n. The environment 550 may be used to allow the clients 553a-n, alone or in combination with the server 551, to execute any of the methods (e.g., 110) described hereinabove.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and networks diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method of 3D modeling, the method comprising:
   providing in computer memory a finite element model representing a subject structural dynamic system, the finite element model programmed to have mechanical features of the subject structural dynamic system;
   in a processor coupled to the computer memory, solving a system of equations with a first term representing a linear combination of a mass, a stiffness, and a damping of the finite element model and a second term representing modal damping, the system of equations solved using a Sherman-Morrison-Woodbury formula or a preconditioned iterative method; and
   forming an improved 3D model of a real world object based on the finite element model by utilizing results of the solved system of equations with the finite element model and modal damping to model the mechanical features of the represented structural dynamic system, forming the improved 3D model of the real world object including modifying one or more properties of the 3D model corresponding to physical properties of the real world object achieving a design goal of the real world object.

2. The method of claim 1 wherein solving the system of equations using the Sherman-Morrison-Woodbury formula comprises:
expanding a matrix of the system of equations by including an auxiliary vector of unknowns to a set of unknowns of the system of equations, the auxiliary vector having a size equivalent to a number of eigenmodes used in the second term representing the modal damping; and
solving the system of equations with the expanded matrix.

3. The method of claim 1 wherein the preconditioned iterative method includes at least one of: a Richardson iterative scheme, a preconditioned minimal residual method, a conjugate gradient method, and a generalized minimal residual method.

4. The method of claim 1 wherein the preconditioned iterative method utilizes the first term, representing the linear combination of a mass, a stiffness, and a damping of the finite element model without modal damping, as a preconditioner.

5. The method of claim 1 wherein the providing and solving are implemented in an existing linear equation solver.

6. The method of claim 1 wherein the subject structural dynamic system is at least one of: an automotive noise and vibration system, an automotive durability system, an airspace dynamics system, and a seismic system.

7. The method of claim 1 wherein the mechanical features of the represented structural dynamic system include at least one of:
velocity, acceleration, strain, stress, frequency, density, vibration, displacement, and force.

8. A computer system for 3D modeling, the computer system comprising:
a processor; and
a memory with computer code instructions stored thereon, the processor and the memory, with the computer code instructions being configured to cause the system to:
provide a finite element model representing a subject structural dynamic system, the finite element model programmed to have mechanical features of the subject structural dynamic system;
solve a system of equations with a first term representing a linear combination of a mass, a stiffness, and a damping of the finite element model and a second term representing modal damping, the system of equations solved using a Sherman-Morrison-Woodbury formula or a preconditioned iterative method; and
form an improved 3D model of a real world object based on the finite element model by utilizing results of the solved system of equations with the finite element model and modal damping to model the mechanical features of the represented structural dynamic system, forming the improved 3D model of the real world object including modifying one or more properties of the 3D model corresponding to physical properties of the real world object achieving a design goal of the real world object.

9. The system of claim 8 wherein solving the system of equations using the Sherman-Morrison-Woodbury formula comprises:
expanding a matrix of the system of equations by including an auxiliary vector of unknowns to a set of unknowns of the system of equations, the auxiliary vector having a size equivalent to a number of eigenmodes used in the second term representing the modal damping; and
solving the system of equations with the expanded matrix.

10. The system of claim 8 wherein the preconditioned iterative method includes at least one of: a Richardson iterative scheme, a preconditioned minimal residual method, a conjugate gradient method, and a generalized minimal residual method.

11. The system of claim 8 wherein the preconditioned iterative method utilizes the first term, representing the linear combination of a mass, a stiffness, and a damping of the finite element model without modal damping, as a preconditioner.

12. The system of claim 8 wherein the providing and solving are implemented in an existing linear equation solver.

13. The system of claim 8 wherein the subject structural dynamic system is at least one of: an automotive noise and vibration system, an automotive durability system, an airspace dynamics system, and a seismic system.

14. The system of claim 8 wherein the mechanical features of the represented structural dynamic system include at least one of:
velocity, acceleration, strain, stress, frequency, density, vibration, displacement, and force.

15. A computer program product for 3D modeling, the computer program product executed by a server in communication across a network with one or more clients and comprising:
a computer readable medium, the computer readable medium comprising program instructions which, when executed by a processor causes:
providing a finite element model representing a subject structural dynamic system, the finite element model programmed to have mechanical features of the subject structural dynamic system;
solving a system of equations with a first term representing a linear combination of a mass, a stiffness, and a damping of the finite element model and a second term representing modal damping, the system of equations solved using a Sherman-Morrison-Woodbury formula or a preconditioned iterative method; and
forming an improved 3D model of a real world object based on the finite element model by utilizing results of the solved system of equations with the finite element model and modal damping to model the mechanical features of the represented structural dynamic system, forming the improved 3D model of the real world object including modifying one or more properties of the 3D model corresponding to physical properties of the real world object achieving a design goal of the real world object.

16. The computer program product of claim 15 wherein solving the system of equations using the Sherman-Morrison-Woodbury formula comprises:
expanding a matrix of the system of equations by including an auxiliary vector of unknowns to a set of unknowns of the system of equations, the auxiliary vector having a size equivalent to a number of eigenmodes used in the second term representing the modal damping; and solving the system of equations with the expanded matrix.

17. The computer program product of claim 15 wherein the preconditioned iterative method includes at least one of: a Richardson iterative scheme, a preconditioned minimal residual method, a conjugate gradient method, and a generalized minimal residual method.

18. The computer program product of claim 15 wherein the preconditioned iterative method utilizes the first term, representing the linear combination of a mass, a stiffness, and a damping of the finite element model without modal damping, as a preconditioner.

19. The computer program product of claim 15 wherein the providing and solving are implemented in an existing linear equation solver.

20. The computer program product of claim 15 wherein the subject structural dynamic system is at least one of: an automotive noise and vibration system, an automotive durability system, an airspace dynamics system, and a seismic system.

* * * * *